US006795812B1

(12) United States Patent
Lent et al.

(10) Patent No.: US 6,795,812 B1
(45) Date of Patent: Sep. 21, 2004

(54) IMPLEMENTING A COUNTER OFFER FOR AN ON LINE CREDIT CARD APPLICATION

(75) Inventors: Jeremy Lent, San Francisco, CA (US); Timothy Coltrell, San Francisco, CA (US); Munnamgi S. Reddi, San Francisco, CA (US); Christopher O. Tracy, San Francisco, CA (US); TaChung Huang, San Francisco, CA (US)

(73) Assignee: NextCard, Inc., San Francisco, CA (US)

( * ) Notice: Subject to any disclaimer, the term of this patent is extended or adjusted under 35 U.S.C. 154(b) by 412 days.

(21) Appl. No.: 09/595,601

(22) Filed: Jun. 15, 2000

Related U.S. Application Data

(63) Continuation-in-part of application No. 09/185,201, filed on Nov. 3, 1998, and a continuation-in-part of application No. 09/185,878, filed on Nov. 3, 1998, and a continuation-in-part of application No. 09/185,000, filed on Nov. 3, 1998.

(51) Int. Cl.[7] .............................................. G06F 17/60
(52) U.S. Cl. ........................................................ 705/38
(58) Field of Search ..................................... 705/38, 35

(56) References Cited

U.S. PATENT DOCUMENTS

| | | | | |
|---|---|---|---|---|
| 5,375,055 A | * | 12/1994 | Togher et al. | 705/37 |
| 5,866,889 A | * | 2/1999 | Weiss et al. | 235/379 |
| 5,930,776 A | * | 7/1999 | Dykstra et al. | 705/38 |
| 5,940,811 A | * | 8/1999 | Norris | 705/38 |
| 5,940,812 A | * | 8/1999 | Tengel et al. | 705/38 |
| 5,966,699 A | * | 10/1999 | Zandi | 705/38 |
| 5,970,478 A | * | 10/1999 | Walker et al. | 705/35 |
| 6,014,645 A | * | 1/2000 | Cunningham | 705/38 |
| 6,088,686 A | * | 7/2000 | Walker et al. | 705/38 |
| 6,185,543 B1 | * | 2/2001 | Galperin et al. | 705/38 |
| 6,202,053 B1 | * | 3/2001 | Chritiansen et al. | 705/38 |
| 6,289,319 B1 | * | 9/2001 | Lockwood | 705/35 |
| 6,324,524 B1 | * | 11/2001 | Lent et al. | 705/38 |
| 6,385,594 B1 | * | 5/2002 | Lebda et al. | 705/38 |
| 6,438,526 B1 | * | 8/2002 | Dykes et al. | 705/38 |
| 6,622,131 B1 | * | 9/2003 | Brown et al. | 705/38 |
| 2001/0027436 A1 | * | 10/2001 | Tenembaum | 705/38 |
| 2002/0023051 A1 | * | 2/2002 | Kunzle et al. | 705/38 |
| 2002/0029188 A1 | * | 3/2002 | Schmid | 705/38 |
| 2003/0055778 A1 | * | 3/2003 | Erlanger | 705/38 |

FOREIGN PATENT DOCUMENTS

WO  WO 99/09470 A1 * 2/1999

OTHER PUBLICATIONS

Microsoft Press Computer Dictionary, Third Edition, Microsoft Press, Redmond, 1997, pp. 88 and 265.*
Whiteside, D.E., "One Million and Counting," Collections and Credit Risk, vol. 1, No. 11, p. 38, Nov. 1996.*
Emigh, J., "AnswerSoft Unveils Concert for Web–Based Call Centers Feb. 5, 1996," Newsbytes, Feb. 5, 1997.*
Grigonis, R., "Webphony—It's not just Callback Buttons Anymore," Computer Telephony, p. 92, Dec. 1997.*
Microsoft Press Computer Dictionary, third edition, Microsoft Press, Redmond, 1997, pp. 425–426.*
Fickenscher, L., "Providian Undercuts rivals with 7.9% Rate Offer," American banker, vol. 163, p. 16, Oct. 8, 1998.*
Fargo, J., "The Internet Specialists," Credit Card Management, vol. 11, No. 10, pp. 38–45, Jan. 1999.*
Lemay, T., "Browsing for a Mortgage a Click away," Financial Post, p. 1, Jan. 15, 2000.*
Wijnen, R., "Banks Fortify Online Services," Bank Technology News, vol. 13, No. 3, p. 8, Mar., 2000.*

* cited by examiner

Primary Examiner—Nicholas D. Rosen
(74) Attorney, Agent, or Firm—Van Pelt & Yi LLP

(57) ABSTRACT

A system and method are disclosed for offering credit to an applicant. A plurality of offers are determined using information about the applicant. A displayed offer is displayed and a withheld offer is withheld. An indication that the displayed offer is unacceptable is received and the withheld offer is displayed.

17 Claims, 14 Drawing Sheets

INPUT TABLE

```
O APR TOO HIGH
O LONGER INTRO
O WANT INTRO

O LINE TOO LOW FOR PURCHASES
O LINE TOO LOW FOR BALANCE TRANSFER

BT AMOUNT $_,___      REQUESTED CREDIT LIMIT $_,___
☐ GET COUNTER OFFER
```

FIG. 7B

IMPLEMENTING A COUNTER OFFER FOR AN ON LINE CREDIT CARD APPLICATION

CROSS REFERENCE TO RELATED APPLICATIONS

This application is a continuation in-part and claims priority to U.S. patent application Ser. No. 09/185,201 entitled: "Method And Apparatus For Real Time On Line Credit Approval", filed Nov. 3, 1998, which is herein incorporated by reference; and U.S. patent application Ser. No. 09/185,878 entitled: "Method And Apparatus For A Verifiable On Line Rejection Of An Applicant For Credit", filed Nov. 3, 1998, which is herein incorporated by reference; and U.S. patent application Ser. No. 09/185,000 entitled: "Method And Apparatus For An Account Level Offer Of Credit And Real Time Balance Transfer", filed Nov. 3, 1998 which is herein incorporated by reference. This application is related to U.S. patent application Ser. No. 09/595,556, filed Jun. 15, 2000, entitled: "Integrating Live Chat Into An Online Credit Card Application" which is herein incorporated by reference.

FIELD OF THE INVENTION

The present invention relates generally to online transactions. More specifically, a counter offer process for an online credit card application is disclosed.

BACKGROUND OF THE INVENTION

Considerable marketing effort is involved in getting an applicant to log on to a credit card website and apply for a credit card. In addition to advertising, credit cards that allow a user to apply for a card over the Internet in some cases pay significant referral fees to a party that refers an applicant to the site. Given the effort and cost required to draw an applicant to an on-line credit card application, it is very important that if, at all possible, the applicant be encouraged to complete the process.

Various reasons exist why an applicant might cancel out of a credit card application that has already been started. The applicant may become confused during the process and may cancel when he is unable to discern how to follow certain instructions. Also, an applicant may reject an offer for credit because of some attribute of the credit offer that the applicant finds unacceptable. Whatever the reason that the applicant does not complete the process and receive the credit card, the cost to the marketer of the credit card is significant. It would be very helpful if an on line credit card application system could be improved to reduce the number of applicants that stop the process short of obtaining a credit card.

SUMMARY OF THE INVENTION

A system for providing an applicant with a counter offer of credit when the applicant rejects a first offer is disclosed. In one embodiment, an applicant who requests a counter offer is directed to a chat agent. The applicant ID is transferred to the chat agent so the chat agent can access information about the state of the applicant's application. Using the chat interface, the applicant explains to the chat agent why the original offer was not acceptable and the chat agent interacts with an application database to determine a counter offer. The counter offer is transferred to the applicant through an application server.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a method of offering credit to an applicant includes determining a plurality of offers using information about the applicant. A displayed offer is displayed and a withheld offer is withheld. An indication that the displayed offer is unacceptable is received and the withheld offer is displayed.

In one embodiment, a method of offering credit to an applicant includes determining a plurality of offers using information about the applicant. A displayed offer is displayed and a plurality of withheld offers are withheld. An indication that the displayed offer is unacceptable is received including an indication that an attribute is unacceptable. A selected withheld offer is selected using the attribute that is unacceptable and the selected withheld offer is displayed.

In one embodiment, a method of offering credit to an applicant includes determining a plurality of offers using information about the applicant. A displayed offer is displayed and a plurality of withheld offers are withheld. An indication that the displayed offer is unacceptable is received including an indication that a plurality of attributes are unacceptable. A primary unacceptable attribute is determined and a selected withheld offer is selected using the primary unacceptable attribute. The selected withheld offer is displayed.

In one embodiment, a method of offering credit to an applicant includes determining an offer using information about the applicant and displaying the offer to the applicant. An indication that the displayed offer is unacceptable is received. An attribute of the offer that is unacceptable is determined. In the event that the unacceptable attribute is the amount of the credit limit; the credit limit is recalculated for the applicant.

In one embodiment, a method of offering credit to an applicant includes determining a first offer using information about the applicant and displaying the first offer to the applicant. A chat interface is activated between the applicant and a customer service agent. A second offer for the applicant is determined based on chat between the applicant and the customer service agent and the second offer is displayed to the applicant.

In one embodiment, an application server for providing a counter offer of credit includes an applicant interface configured to receive applicant data from an applicant browser and to communicate an offer of credit to the applicant and the counter offer of credit to the applicant. A processor is configured to determine the offer of credit based on the applicant data and the counter offer of credit based on an unacceptable attribute of the first offer of credit and an agent interface is configured to receive the unacceptable attribute from an agent.

In one embodiment, a chat server for providing a counter offer of credit includes an applicant interface configured to receive chat from an applicant. An agent interface is configured to receive chat from an agent and an unacceptable attribute determined from the chat from the applicant. An application server interface is configured to send the unacceptable attribute and to receive a counter offer.

In one embodiment, an applicant client for obtaining a counter offer of credit includes an application server interface configured to send applicant information and to receive and offer of credit and a counter offer of credit. A chat server interface is configured to be activated upon an indication that the offer of credit is not acceptable.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 7B is a screen shot illustrating a display of offer terms used in one embodiment for determining which terms are unacceptable.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In one embodiment, an applicant interacts with a web server and receives a web page containing offers of credit that may be accepted by the applicant. At any point during the interaction with the web server, an online chat button or process may be activated that sends an applicant ID to a chat server and opens a chat window so that the applicant can receive help. In one embodiment, the help takes the form of the applicant describing why a displayed offer is unacceptable and a counter offer being generated for the applicant.

Figure 1:
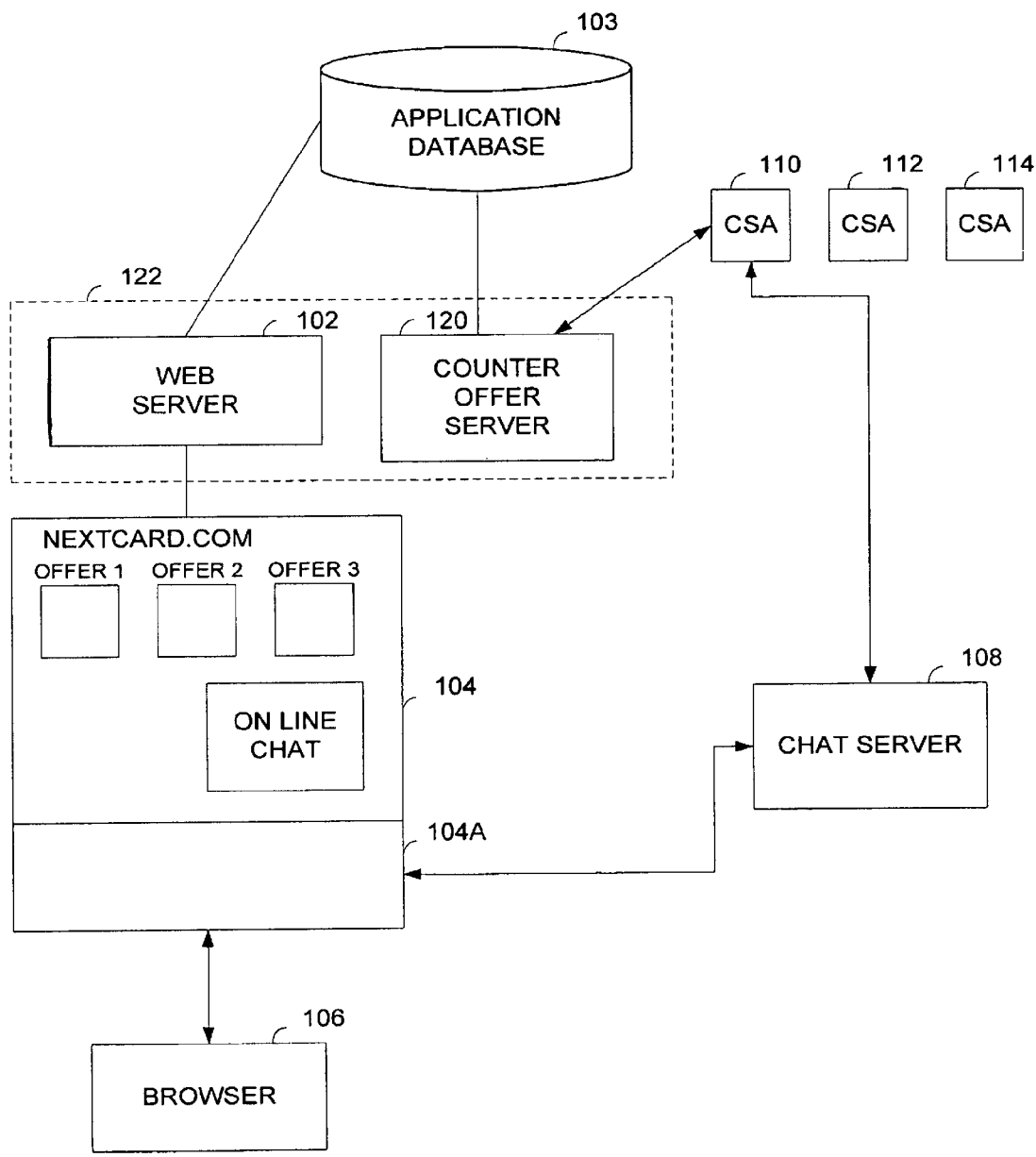
FIG. 1 is a block diagram illustrating a system for providing real time chat help to an applicant and generating a counter offer when appropriate.

FIG. 1 is a block diagram illustrating a system for providing real time chat help to an applicant and generating a counter offer when appropriate. A web server 102 is in communication with an application database 103. Application database 103 is used to store information about the applicant and the application. The information stored includes information provided by the applicant as well as information derived from various credit bureaus (not shown) that are accessed by the web server either directly or indirectly. Each application included in the application database is referenced by an applicant identifier that can be used to identify the application.

Web server 102 provides a web page 104 to a browser 106. Typically, the web server and browser communicate over the Internet using HTTP. Web page 104 is shown for the purpose of illustration as an offer web page that includes three offers made to the applicant for a credit card as well as an on-line chat button that may be activated by the applicant to obtain help or to discuss the offers. Other web pages provided by the web server include forms that the applicant fills out to provide information so that a credit report may be obtained and an offer of credit generated based on the applicant's personal information.

An online application process for a credit card is described in detail in U.S. patent application Ser. No. 09/185,201, entitled: "Method And Apparatus For Real Time Online Credit Approval", filed Nov. 3, 1998, which was previously incorporated by reference; and U.S. patent application Ser. No. 09/185,878, entitled: "Method And Apparatus For A Verifiable Online Rejection Of An Applicant For Credit", filed Nov. 3, 1998, which was previously incorporated by reference; and U.S. patent application Ser. No. 09/185,000, entitled: "Method And Apparatus For An Account Level Offer Of Credit And Real Time Balance Transfer", filed Nov. 3, 1998 which was previously incorporated by reference.

It should be noted that the process described herein will refer to the online credit application as being an application for a credit card. The process can also be applied to other offers of credit including an offer of instant credit for the purpose of consummating a single pending online transaction. In addition, the system and processes disclosed herein may be applied to other types of business transactions over the Internet. However, the particular architecture and processes described are especially useful for processing online credit card applications and the benefit of their application to online credit card applications is particularly strong.

Web server 102 and browser 106 continue to interact in a standard fashion with web pages being provided by web server 102 and the applicant filling out information as needed. At some point, an applicant may activate the online chat button included on the web page and a chat window 104a opens up for the chat application and a connection is established with a chat server 108. As is described further below, the chat window is opened and the connection with chat server 108 may be initiated by events other than just the activation of the online chat button. Chat server 108 implements a standard chat environment such as the chat environment available from e-share. Other chat environments may be used that include the ability to pass a variable to the chat server from the browser.

The various servers shown in FIG. 1 may be implemented on any typical platform such as a Windows NT platform, a Linux platform, or other UNIX platform or other commercially available web server platform. The browser may be implemented on any system such as a Macintosh or a PC which are readily available.

In some embodiments, the chat process is initiated when the applicant cancels out of the application. In other embodiments, the chat process is initiated when the applicant lingers on a page for an amount of time that exceeds a threshold. In other embodiments, the chat process is initiated when the applicant's response to a request for information is somehow inadequate. For example, it may be detected that the answers provided by the applicant are incomplete or in the wrong form. The chat process may be initiated for the purpose of providing the applicant more detailed instructions or pointing out to the applicant the information that is required to complete the application.

In addition to opening the chat connection to chat server 108, browser 106 also sends the applicant identifier to the chat server. The chat server then uses the applicant identifier to access information about the application in the application database. It should be noted that the applicant identifier may be used as an application identifier in circumstances such as would be expected for an online credit card application where there is one and only one application per applicant. In other embodiments, an application identifier that is unique for each application is assigned and used. In this description, wherever an applicant identifier is mentioned, an application identifier could also be used.

Sending the applicant identifier to the chat server instead of sending the current web page or other information to the chat server is preferable from a security standpoint because the applicant identifier can only be used to obtain information about the application by accessing application database 103. In addition, preferably, the applicant identifier is encrypted, adding a further level of security.

In the embodiment shown, chat server 108 does not have a direct link to the application database 103. Chat server 108 is connected to a customer service agent 110. Customer service agent 110 handles the chat session, responding to requests made by the applicant. Other customer service agents 112 and 114 are also standing by to handle other chat sessions generated by chat server 108. In one embodiment, requests made to the chat server are queued and the next available customer service agent is assigned to the first chat session request found in the queue.

Customer service agent 110 is connected to a counter offer server that is connected to application database 103. By passing the applicant identifier from the chat server to the customer service agent to the application database through the counter offer server, information about the applicant can be obtained from the application database. Connections from the customer service agent to the counter offer server and from the counter offer server to the application database may be made over the Internet or may be a dedicated secure connection.

In the embodiment shown, which is adapted specifically for implementing a counter offer strategy as is described below, a separate web server 102 and counter offer server 120 are shown. This divides the processing demand generated by normal communication with a browser from the processing demand generated by interaction initiated by chat with a customer service agent. This architecture is particularly useful since the two types of traffic are isolated. In other embodiments, the functions of the web server and the counter offer server are performed by a single application server. Dashed box 122 represents a single application server that may include both the web server and the counter offer server. In general, the term application server is used to describe either the web server and counter offer server operating collectively or to describe a single server performing both the function of the web server and the counter offer server.

Additionally, in a system where a counter offer is not generated, counter offer server 120 may be referred to as a customer service agent server or some other term describing its primary function. The important point is that both the web server and the counter offer server both access the application data base to obtain information about the status of the application. In addition, both the web server and the counter offer server may write data to the application database in some embodiments. The common access to the application database enables the customer service agent to obtain information about the status of the application using the applicant identifier received through the chat server and also allows the customer service agent to alter the status of the application based on information received from the applicant through the chat server by sending that information to the counter offer server for posting to the application database.

Thus, an applicant provides information to database 103 via the Internet using web pages in a standard manner. In addition, the applicant may communicate via chat with a customer service agent who also is connected to the application database and may change the state of the application according to information received by the applicant via chat. In the embodiment shown, the customer service agent interacts with a special purpose counter offer server that uses the information provided by the applicant to determine a counter offer using information in the application database. The counter offer is stored in the application database and provided to the applicant's browser via the web server. As noted above, the counter offer server and the web server may be implemented on a single machine referred to as the application server. The various processes operating on the application server, the chat server and the browser are described below for the purpose of illustrating how the chat window may be activated and a counter offer generated for the applicant.

Figure 2:
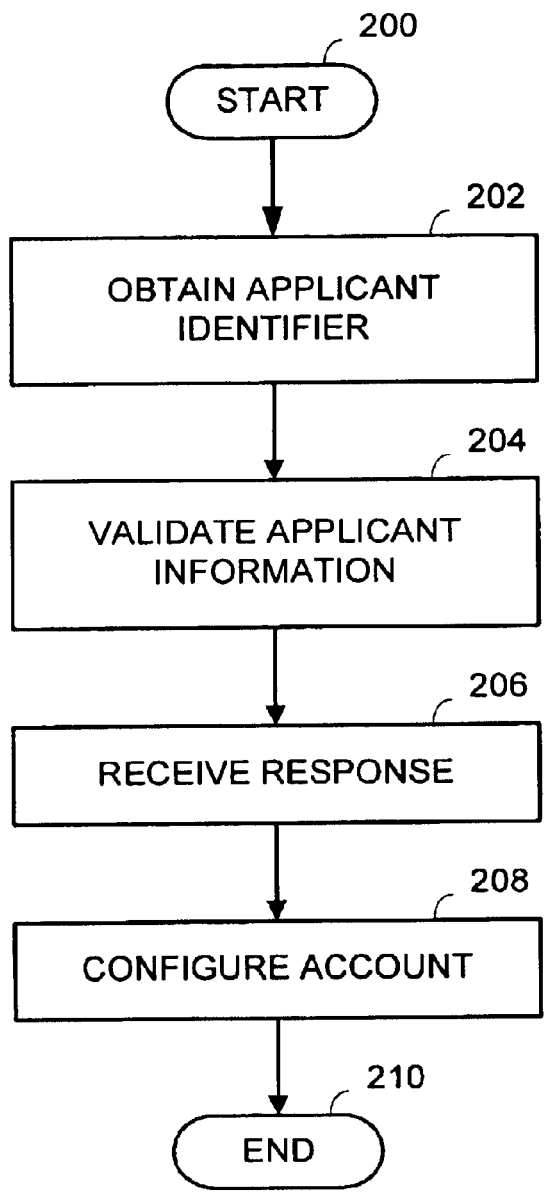
FIG. 2 is a flowchart illustrating a general process implemented on the chat server.

FIG. 2 is a flowchart illustrating a general process implemented on the chat server. The process starts at 200. In a step 202, the applicant identifier is obtained from a browser. In a step 204, the chat server validates the applicant information by communicating with the application database. In some embodiments, the chat server may communicate directly with the application database. In other embodiments, as shown in FIG. 1, the chat server communicates with the application database through an application server. After the applicant information is validated, a response is received from the applicant via chat. Based on the response, the applicant account is configured in a step 208 and the process ends at 210.

Figure 3:
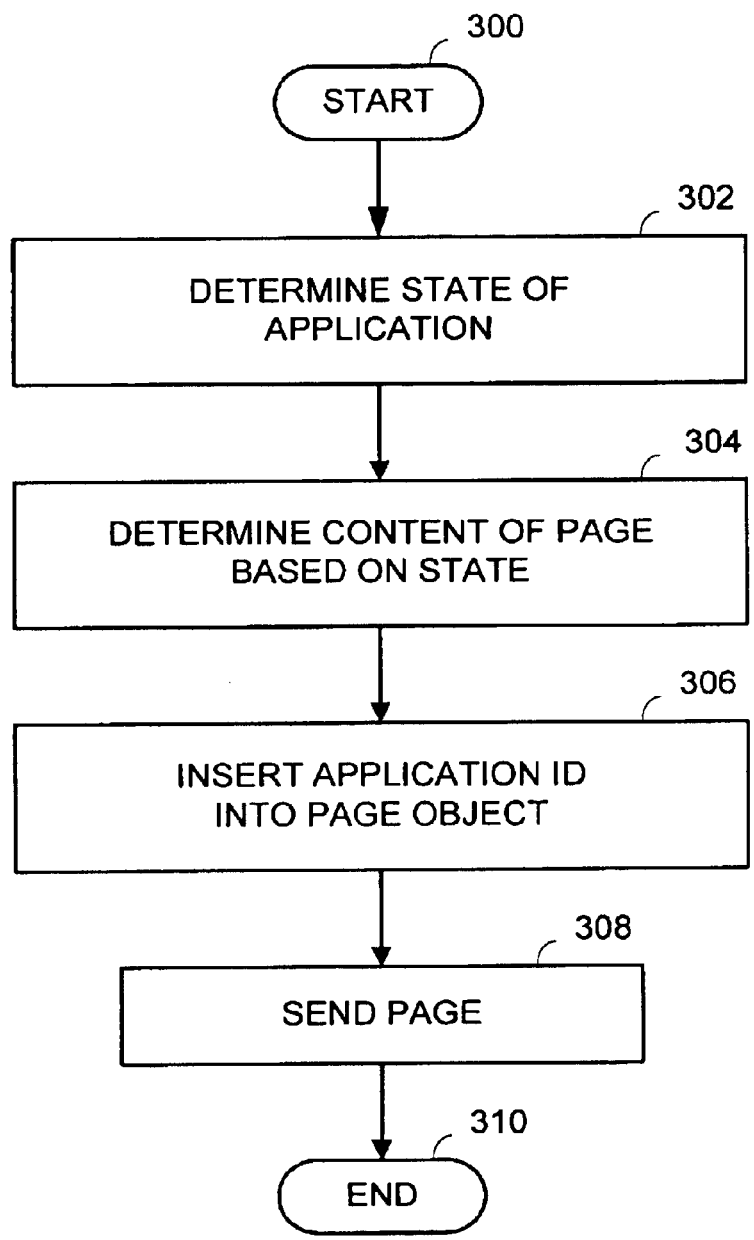
FIG. 3 is a flow chart illustrating a general process implemented on the web server for sending dynamic web pages to the applicant.

FIG. 3 is a flow chart illustrating a general process implemented on the web server for sending dynamic web pages to the applicant. The dynamic web pages differ from a standard web page used to interact with the applicant because they contain a page object used to initiate a chat section with a chat server upon the occurrence of certain events. The page object includes an applicant identifier that is passed to the chat server. The process starts at 300 when chat is initiated based on a user action. As described above, the user action may be the activation of a help or chat button or the user canceling out of the application. Chat may also be activated by user inaction when a response is not received or by an improper action taken by a user resulting in an invalid response. In a step 302, the state of the application is determined. Next, in a step 304, the content of the page to be sent to applicant is determined based on the state of the application. Next, in a step 306, the applicant identifier is inserted into a page object. In a step 308, the page is sent to the applicant browser and the process ends at 310.

Figure 4:
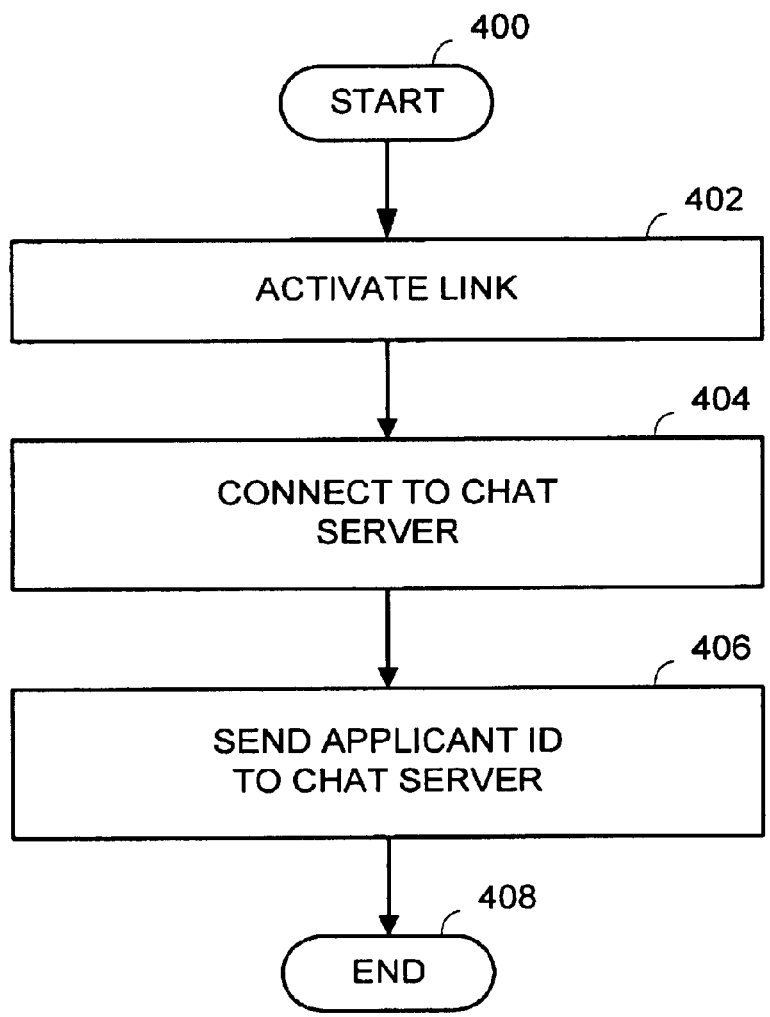
FIG. 4 is a flow chart illustrating a process implemented on a browser for establishing a connection to a chat server.

FIG. 4 is a flow chart illustrating a process implemented on a browser for establishing a connection to a chat server. The process starts at 400. In a step 402, a link to the chat server is activated either directly by the user or as a result of the occurrence of an event as described above. In a step 404, a connection is established to the chat server. Typically the connection uses a protocol such as HTTPS. Next, in a step 406, the applicant identification is sent to the chat server and the process ends at 408.

Figure 5:
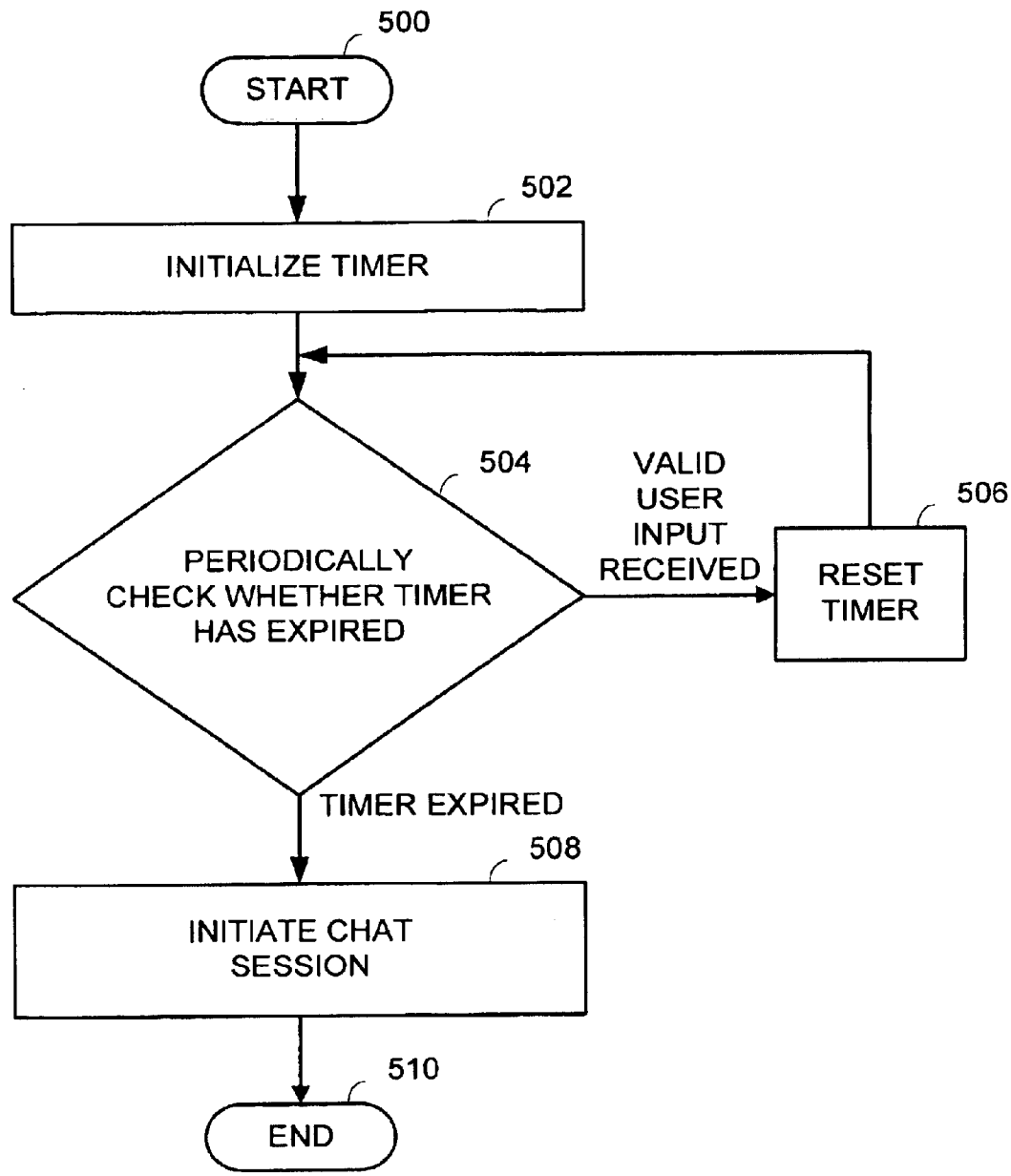
FIG. 5 is a flowchart illustrating a typical process implemented on the browser for the purpose of initializing chat when the user does not respond to a downloaded web page in a certain period of time.

FIG. 5 is a flowchart illustrating a typical process implemented on the browser for the purpose of initializing chat when the user does not respond to a downloaded web page in a certain period of time. The process starts at 500. In a step 502, a timer is initialized. Control is then transferred to 504 where periodic checks are made to determine whether the timer has expired. If a valid user input is received, control is transferred to a step 506 and the timer is reset. If the timer expires, then control is transferred to a step 508 and a chat session is initiated as described above. The process then ends at 510.

Figure 6:
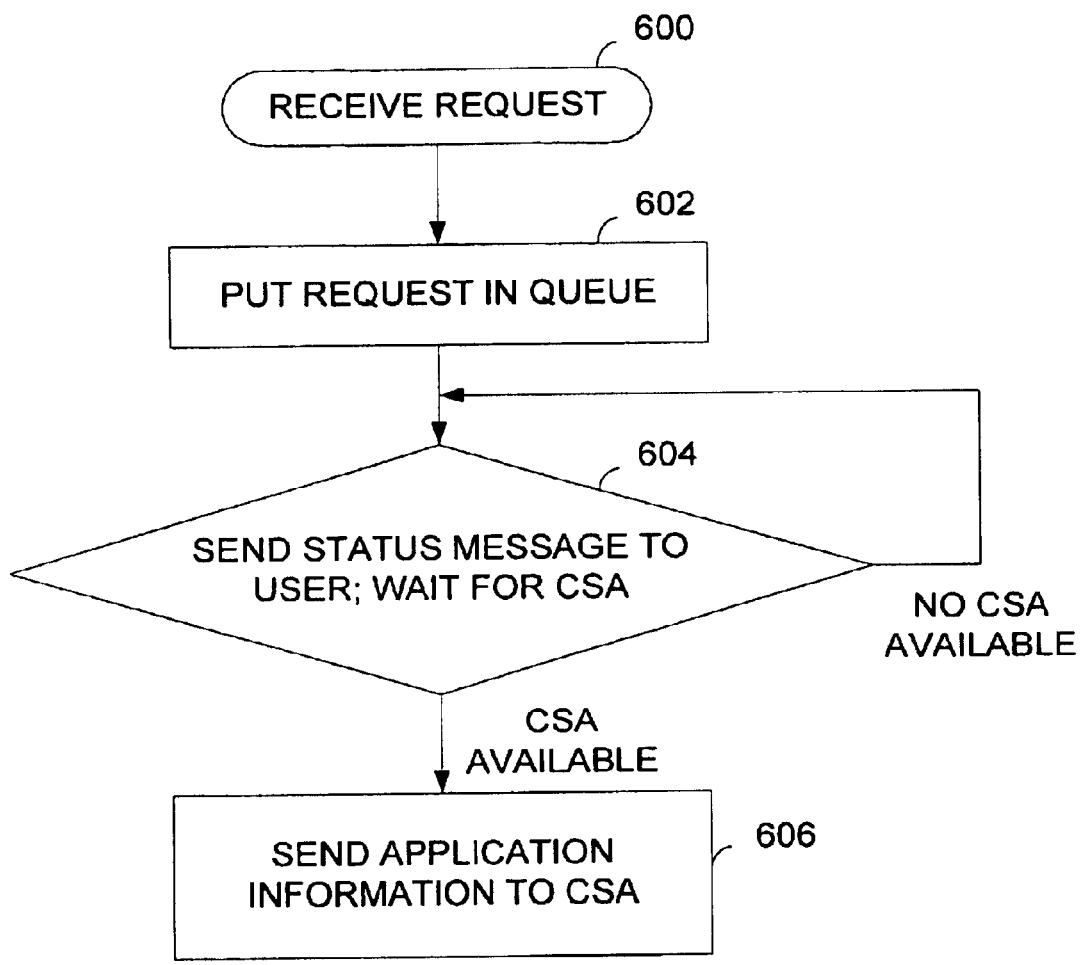
FIG. 6 is a flow chart illustrating a process implemented on a chat server when a chat session is requested by a browser as described above.

FIG. 6 is a flow chart illustrating a process implemented on a chat server when a chat session is requested by a browser as described above. The process starts at 600 when the request is received. The request for a chat session includes both a connection request and the applicant identifier. In a step 602, the request is put into a queue and the applicant identifier is stored in a manner that associates it with the request. In some embodiments, the chat server uses the applicant identifier while the request is still in the queue to obtain the application information from the application database. In other embodiments, the applicant identifier is not used to access the application database until the request is assigned to a customer service agent. This insures that when the customer service agent accesses the information about the application, the information is up to date. In a step 604, a status message is sent to the user and the system then waits for an available customer service agent. So long as no customer service agent is available, the system continues to wait at 604. When a customer service agent becomes available, control is transferred to a step 606 and the application information is sent to the customer service agent. The customer service agent then uses the application information to discuss the state of the application with the applicant.

Figure 7A:
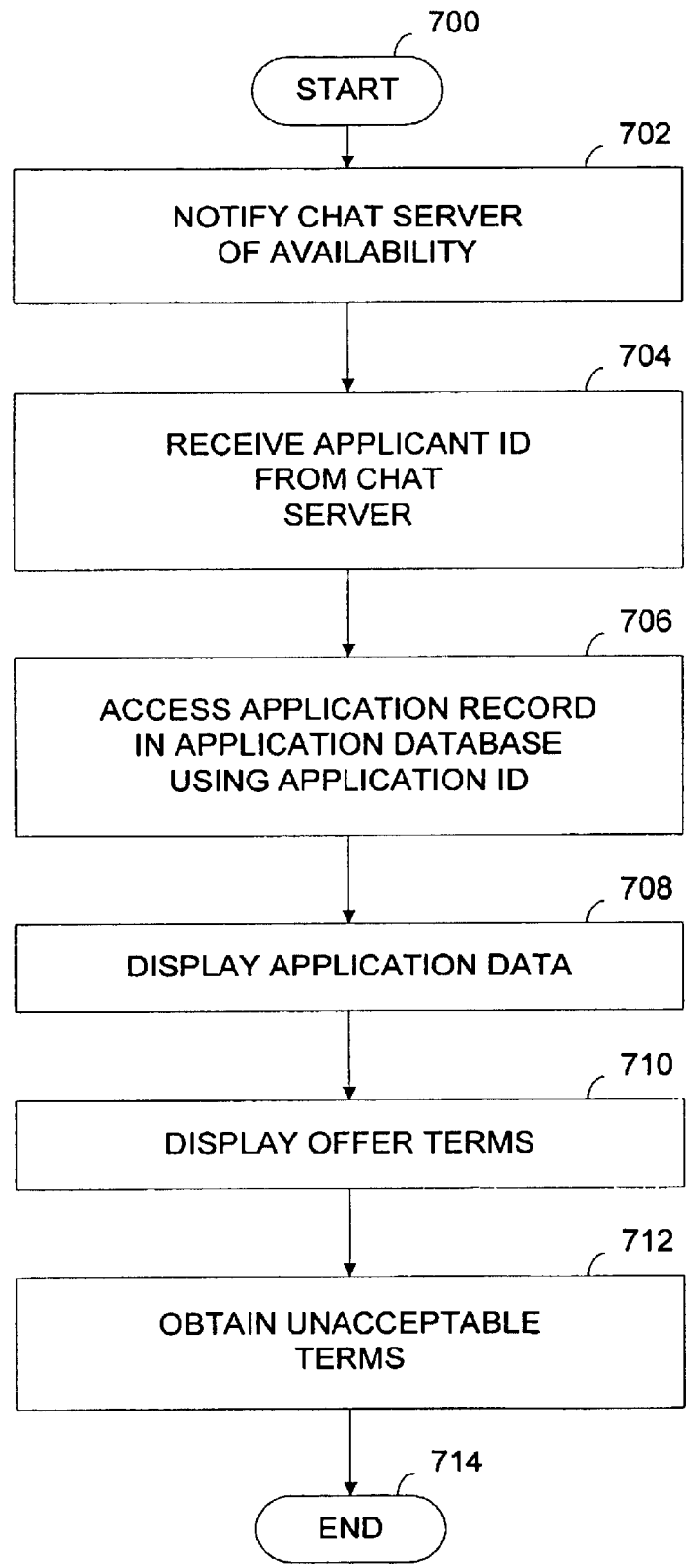
FIG. 7A is a flow chart illustrating a process implemented at a customer service agent for the purpose of supporting the chat session.

FIG. 7A is a flow chart illustrating a process implemented at a customer service agent for the purpose of supporting the chat session. The process may be implemented on a client machine accessed by the customer service agent or may be implemented on the application server which may include a dedicated counter-offer server. The process starts at 700. In a step 702, the customer service agent notifies the chat server that it is available. Next, in a step 704, the applicant identifier is received from the chat server. In a step 706, the applicant record in the application database is accessed using the applicant identifier as mentioned above. The application record may be accessed either directly or via the application server. In a step 708, the chat server displays the application data retrieved using the applicant identifier to the customer service agent. In one embodiment, the application data is displayed by displaying the same web page that the applicant is viewing. In addition, the web page may be augmented with other information about the status of the application. Alternatively, a completely separate application information screen may be displayed to the customer service agent.

In an embodiment where a counter offer is generated by the customer service agent, a display is provided showing various offer terms that the applicant may indicate are not acceptable in the chat between the applicant and the customer service agent. The customer service agent may check one or more of the terms and the terms checked by the customer service agent are sent to the counter offer server to be used in generating a counter offer. The terms or attributes of the offer that the applicant considers to be unacceptable are obtained in a step 712 and the initial process for receiving applicant information and providing information to the counter offer server ends at 714.

It should be noted that a number of different methods of obtaining the unacceptable terms from the applicant may be used. In one embodiment, as described above, a set of offer terms are shown to the customers service agent and the customer service agent selects terms identified by the applicant in chat that are unacceptable. In other embodiments, a display of terms is provided to the applicant and the applicant picks the unacceptable terms with the aid of the customer service agent. In yet another embodiment, the chat generated by the applicant is automatically analyzed by a program which generates the list of unacceptable terms for the counter offer server.

FIG. 7B is a screen shot illustrating a display of offer terms used in one embodiment for determining which terms are unacceptable. The display includes indications that interest rate attributes are not acceptable, indicating that the annual percentage rate or long term interest rate is too high, a longer introductory interest rate is desired, or an introductory interest rate is desired. The introductory interest rate is a very low rate offered for a short period of time when the account is established, also referred to as a teaser rate. In addition, buttons are provided for the customer service agent to check whether the credit limit is too low either for purchases or for balance transfers. In addition, the customer service agent can fill in a balance transfer amount that the applicant wants to transfer as well as a requested credit limit. Finally, a box is provided for the customer service agent to check and send the data to the counter offer server.

Figure 8:
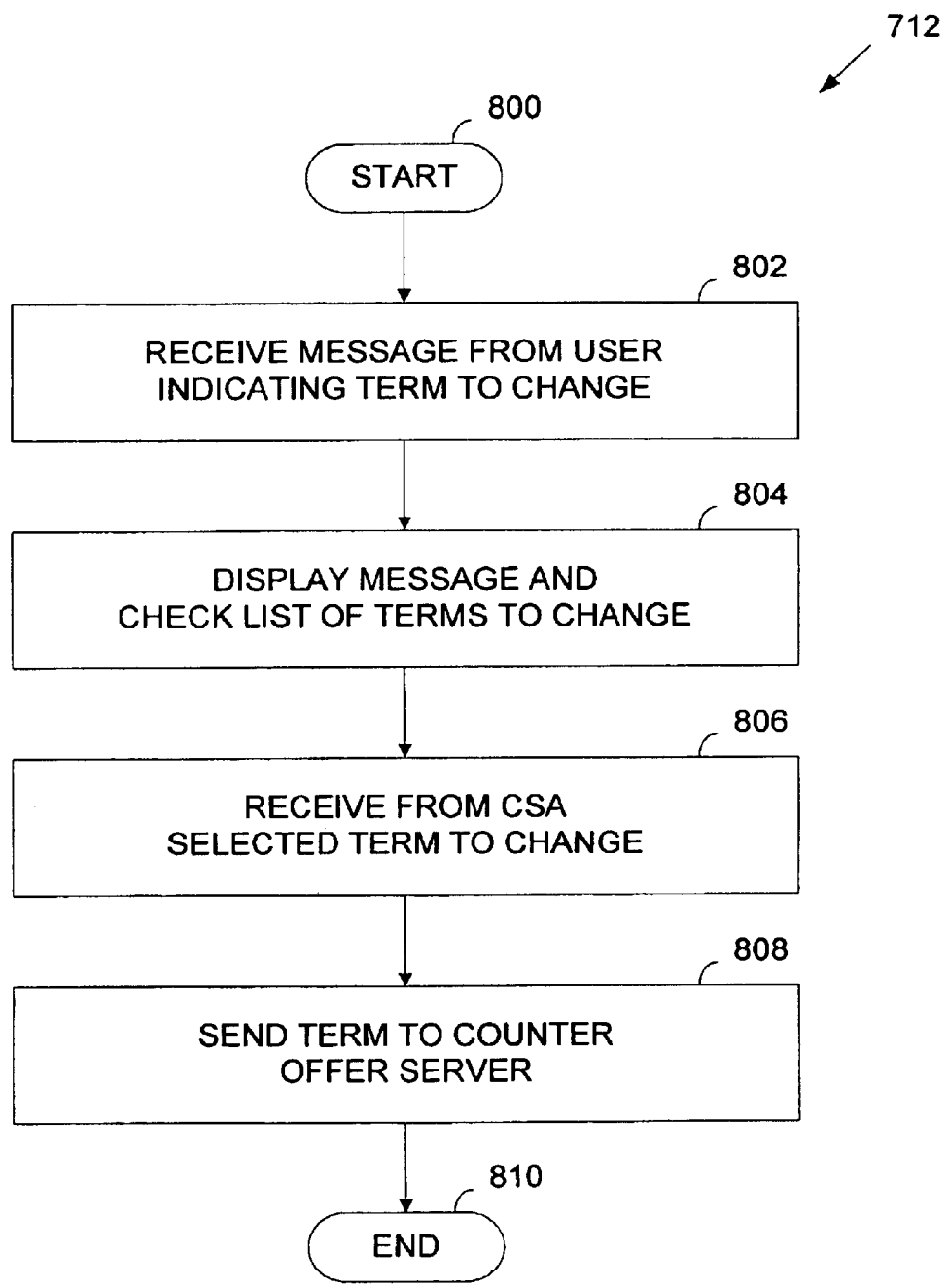
FIG. 8 is a flow chart illustrating in detail a process implemented in step 712 for obtaining the unacceptable terms of an offer from an applicant.

FIG. 8 is a flow chart illustrating in detail a process implemented in step 712 for obtaining the unacceptable terms of an offer from an applicant. The process starts at step 800. In a step 802, a chat message is received from a user indicating a term that the user would like to change. The message is displayed to the customer service agent along with a checklist as shown in FIG. 7B illustrating terms to change. As noted above, the checklist may also be displayed and checked by the applicant. In a step 806, an input is received from the customer service agent of a selected term that the applicant would like to change of an offer. In a step 808, the term is sent to the counter offer server and the process ends at 810.

Figure 9:
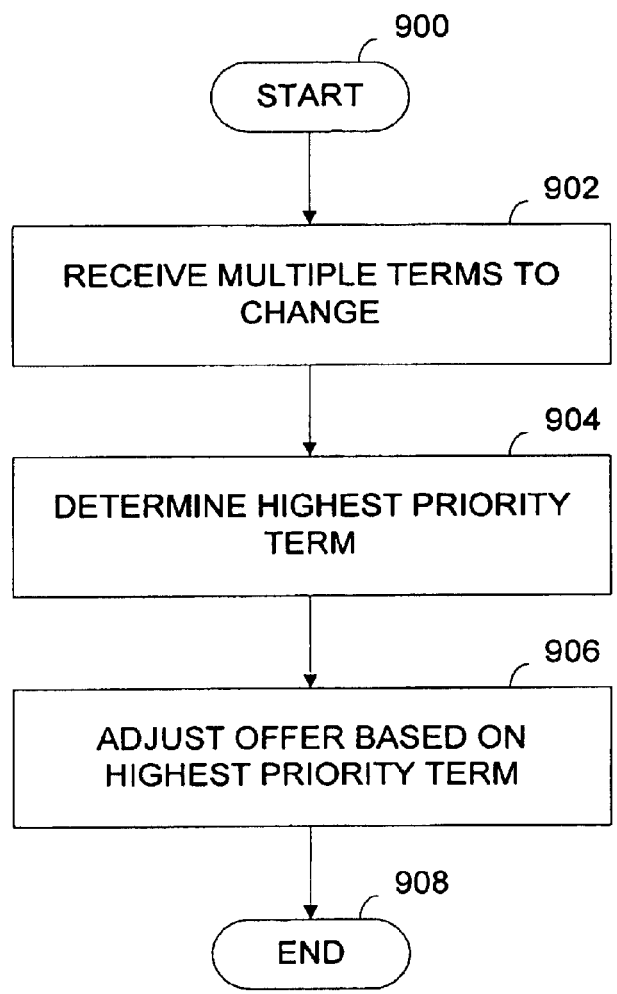
FIG. 9 is a flow chart illustrating the process implemented on the counter offer server when more than one term is selected as being unacceptable to the applicant.

FIG. 9 is a flow chart illustrating the process implemented on the counter offer server when more than one term is selected as being unacceptable to the applicant. In one embodiment, a counter offer is selected based on only one unacceptable term being changed. This simplifies the process of determining a counter offer since changing two terms is somewhat more complex. Therefore, a hierarchy of terms that may be changed by the applicant is provided and the highest priority term selected is used to determine the counter offer. All of the unacceptable terms are still transmitted to the counter offer server and recorded for the purpose of data gathering and analysis of the system. The process starts at 900. In a step 902, multiple unacceptable terms or attributes of the offer are received by the counter offer server. Next, in a step 904, the highest priority term or attribute that is unacceptable is determined. Next, in a step 906, the offer is adjusted and a counter offer is determined based on the highest priority term. The process ends at 908.

Many different methods may be used by the counter offer server to generate a counter offer based on attributes or terms identified by the applicant as being unacceptable. In one embodiment, a number of potential offers are identified based on the applicant information provided and an assessment of the risk associated with extending credit to the applicant. Some of the generated offers are withheld while others are displayed to the applicant. A number of schemes may be used to decide which offers are displayed and which offers are withheld. Some methods may include a statistical selection or a selection according to a marketing scheme designed to increase the rate of acceptance. It may also be the case that the best offer is withheld and kept in reserve to use as a counter offer. In general, certain potential offers are withheld.

The identification by the applicant of an unacceptable term is used by the counter offer server to identify a better offer for the counter offer. In one embodiment, offer strategies are identified and the counter offer is identified by simply looking up an offer strategy associated with the applicant and the identified unacceptable term. In one embodiment, an offer strategy may include a set of offers shown to the applicant as well as offers that are not displayed and that correspond to various unacceptable terms. When an unacceptable term is identified, the offer corresponding to the strategy and the unacceptable term is used as the counter offer.

In some embodiments, the counter offer strategy is dependent on characteristics of the applicant. For example, the applicant may be classified as a "surfer" or "non-surfer". A "surfer" is a person who shifts or surfs balances among credit cards, taking advantage of low teaser rates. A determination that an applicant is a surfer is made based on an analysis of the applicant's credit report. A counter offer strategy designed for such an applicant may adopt the strategy of extending the period of an introductory rate if requested by the applicant, but requiring the applicant to make a certain number of purchases or not transfer the balance for a certain period of time.

In general, added terms and conditions such as purchase requirements or a length of time that a balance may not be transferred from the card may be added to counter offers for the purpose of creating a perceived barrier to receive the counter offer. Such a barrier or condition prevents the applicant from deciding that the first offer should always be rejected. In some embodiments, the conditions are determined based on characteristics of the applicant. As described above, surfers may receive balance transfer time restrictions.

In addition to selecting a withheld offer based on a pre-determined offer scheme, the counter offer server may also recalculate a customized offer based on the identification of an unacceptable term and an actual requested term by the applicant. For example, the applicant may express that the credit limit is too low, either for a desired balance transfer that the applicant wants to make or new purchases. The amount of the credit limit minus the amount of the balance transfer is referred to as the amount of credit that is "open to buy". The information sent to the counter offer server may include a requested credit limit and a requested balance transfer amount. From that information, the counter offer server can determine that the offer credit limit is too low either for the balance transfer requested or for the amount that the applicant wants open to buy. To minimize risk, it is desirable that the credit limit be as low as possible. Therefore, it is desirable not to simply select a withheld offer with a higher credit limit, but instead to customize an offer that conforms to the applicant's request but does not exceed the applicant's request.

Accordingly, a new credit limit may be calculated that incorporates the requested balance transfer and the amount that the applicant wants open to buy. The calculated new offer is of course checked versus the risk profile of the user and it is verified that the higher credit limit is appropriate for the user. Any of the various techniques well known in the art of assigning credit may be used to assess the risk of the applicant and determine an appropriate upper credit limit. Significantly, the counteroffer in the case of a requested higher credit limit is specifically customized for the applicant based on what the applicant requests. In general, any counter offer provided is based on the applicant's identification of an unacceptable term. In some embodiments, if no counter offer is available that improves an unacceptable term identified by the applicant, then a message is returned to the applicant either directly or through the chat interface that indicates that no counter offer can be provided at that time. For example, in one embodiment, the offer strategy may include an offer with the best annual percentage rate available in the set of offers initially displayed to the applicant. In such a case, if the applicant identifies the annual percentage rate as the unacceptable term, then no counter offer improving that term can be generated.

Figure 10:
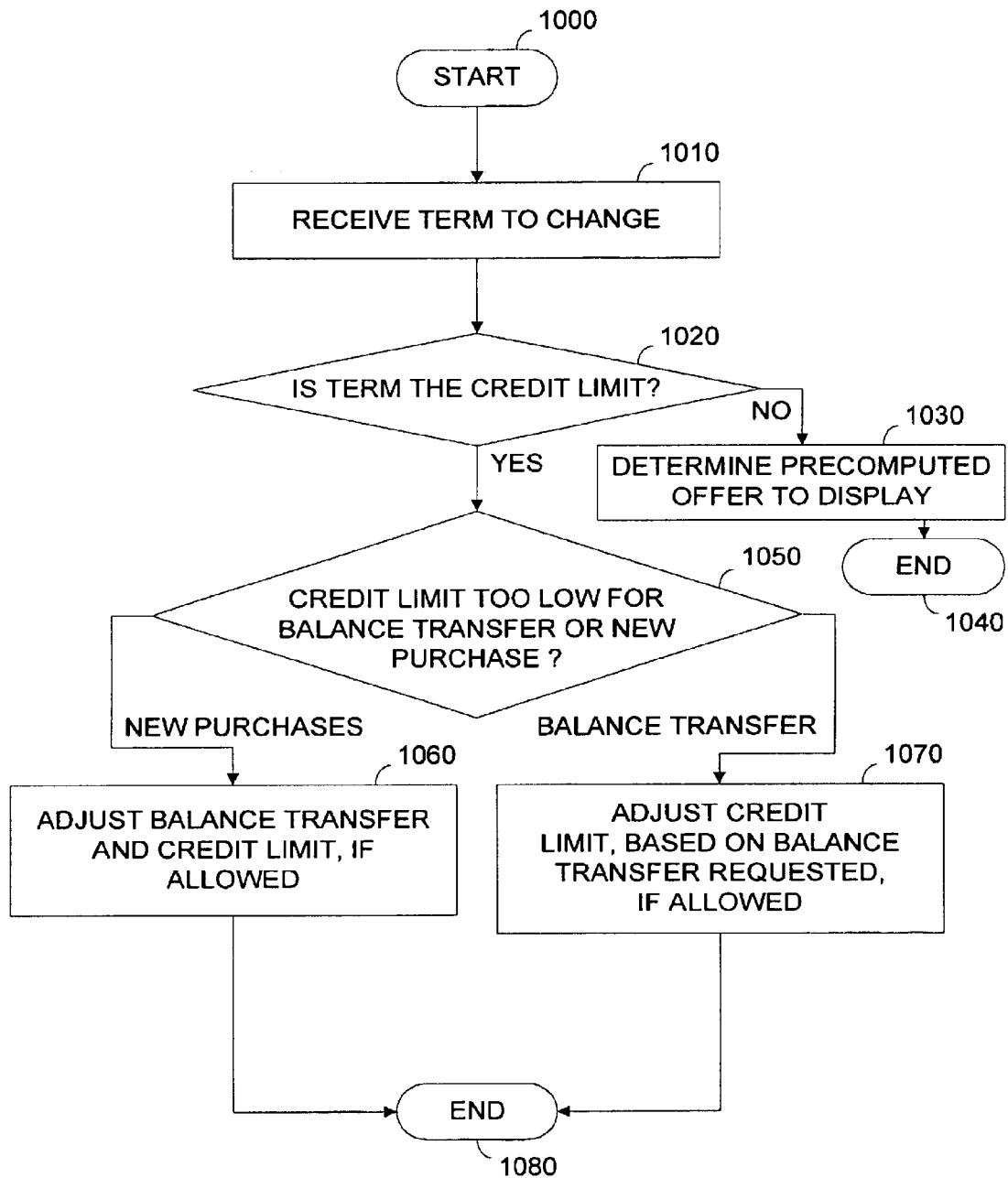
FIG. 10 is a flow chart illustrating an example process for generating a counter offer.

FIG. 10 is a flow chart illustrating an example process for generating a counter offer. The process starts at 1000. In a step 1010, the counter offer server receives the term that is to be changed. Next, in a step 1020, it is determined whether the term is the credit limit or not. If the term is not the credit limit, then control is transferred to a step 1030 and a precomputed offer that was withheld is determined for display. The counter offer determination process then ends at 1040. If the term is the credit limit, then control is transferred to a step 1050 and it is determined whether the credit limit is too low for a requested balance transfer or for new purchases (open to buy). If the credit limit is too low for new purchases, then control is transferred to a step 1060 and the required balance transfer and credit limit are adjusted if that is allowed by the scheme being used to assign credit based on an assessment of the applicant's risk.

If the credit limit is too low for a requested balance transfer, then control is transferred to a step 1070 and the credit limit is adjusted based on the balance transfer requested if allowed by the credit line assignment being used. After the credit limit is adjusted in steps 1060 or 1070, the counter offer is defined and the counter offer determination process ends at 1080. Whether a precomputed offer is determined for display in 1030 or the credit limit is recomputed in step 1060 or 1070, if no better offer can be generated, then a message noting that no better offer can be generated is sent either to the chat server or to the applicant directly.

Once a counter offer has been defined or it has been determined that no counter offer that improves the unacceptable terms can be generated, the applicant is notified of the counter offer terms. In different embodiments, notification may be accomplished in various ways. For example, in one embodiment, a new offer page is generated in the application server based on data written to the application database by the application server. In the embodiment where the application server is split into a web server and a counter offer server, the counter offer server writes data to the application database and the web server generates a counter offer page based on the data written to the application database. In addition, the application server also provides information to the chat server indicating what counter offer, if any, has been generated. The customer service agent then discusses the counter offer with the applicant via the chat interface. In order to view the counter offer page generated by the web server, the applicant is asked to refresh his browser. Refreshing the browser causes the offer page to be requested from the web server and the web server responds with the counter offer page. In one embodiment, a button labeled "view offer" is provided on the displayed page. When the button is selected, the page is downloaded again and any changes are then viewed by the user.

In other embodiments, the displaying of the counter offer page to the applicant is handled somewhat differently. In one embodiment, the chat server enables the display of the page through the applicant's browser automatically, without requiring the applicant to refresh the screen. This can be accomplished in a variety of ways. In one embodiment, the chat server writes a variable to a memory location that the browser checks periodically. When the browser checks the location and finds a variable indicating that the counter offer page should be downloaded, the browser automatically refreshes itself. The applet that enables the browser to check the location and refresh itself may be used in some cases but not others. When such an applet is not used, the process of instructing the applicant through the chat interface to refresh his own browser or to select a button to view the offer may be implemented.

Figure 11:
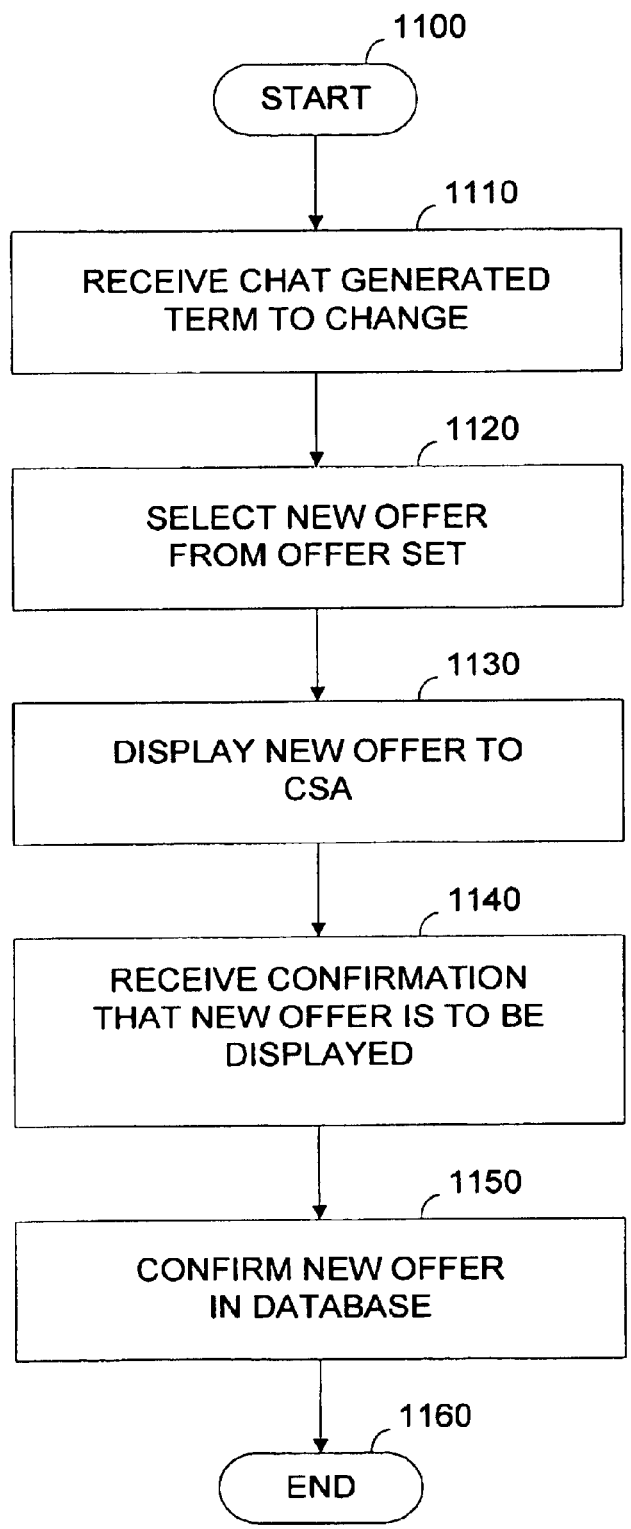
FIG. 11 is a flowchart illustrating a process implemented on a counter offer server to generate and confirm a new offer for display to the applicant.

FIG. 11 is a flowchart illustrating a process implemented on a counter offer server to generate and confirm a new offer for display to the applicant. The process starts at 1100. In a step 1110, the counter offer server receives a chat generated term to change. As described above, the term can be identified based on chat by a customer service agent or the term can be automatically determined by analysis of the chat provided by the applicant or the term can be identified using a pick list provided to the applicant. In a step 1120, a new offer is selected from an offer set included in the offer strategy being used for the applicant. As described above, in some embodiments, a new offer is actually calculated based on information provided by the applicant such as a requested credit limit. Next, in a step 1130, the new offer is displayed to the customer service agent. The customer service agent then communicates with the applicant about the new offer to determine the applicant's interest. The customer service agent then confirms to the counter offer server that the new offer is to be shown to the applicant. The confirmation is received in step 1140 and in a step 1150, the counter offer server confirms the new offer in the data base so that it is ready to be displayed when the applicant's browser refreshes. The process then ends at 1160.

In some embodiments, the new offer is confirmed in the database concurrent with it being displayed to the customer service agent. Then, whenever the applicant's browser refreshes, the counter offer will be displayed. In some embodiments, it is desired that the display of the counter offer not be enabled until customer service agent has an opportunity to chat with the applicant about the new offer and confirm that display is appropriate.

Figure 12:
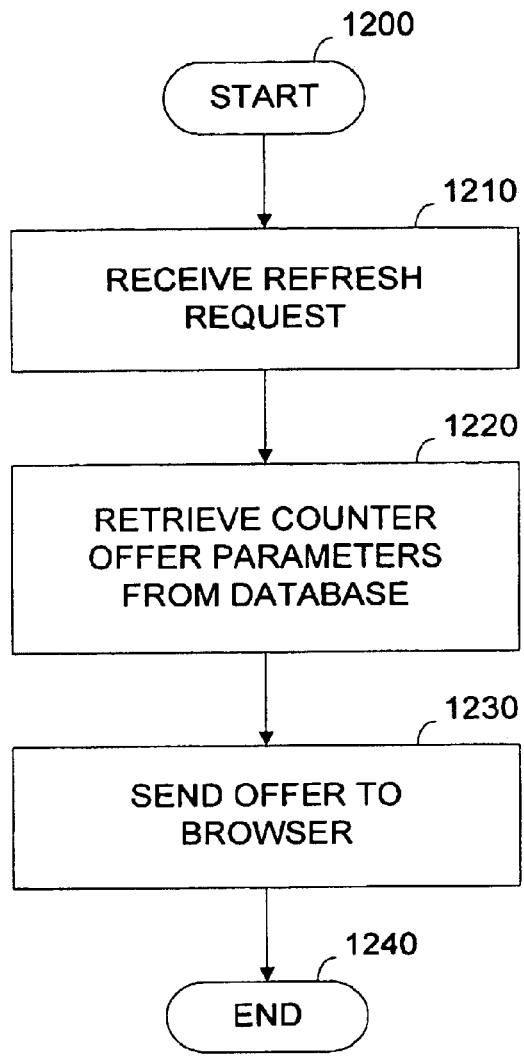
FIG. 12 is a flowchart illustrating a process implemented on the web server portion of the application server for the purpose of displaying a new counter offer to the applicant.

FIG. 12 is a flowchart illustrating a process implemented on the web server portion of the application server for the purpose of displaying a new counter offer to the applicant. The process starts at 1200. In a step 1210, the web server receives a refresh request from the applicant's browser. Next, in a step 1220, the counter offer parameters are retrieved from the application data base and a web page including the counter offer is generated. Then in a step 1230, the counter offer page is sent to the browser. The process ends at 1240.

Figure 13:
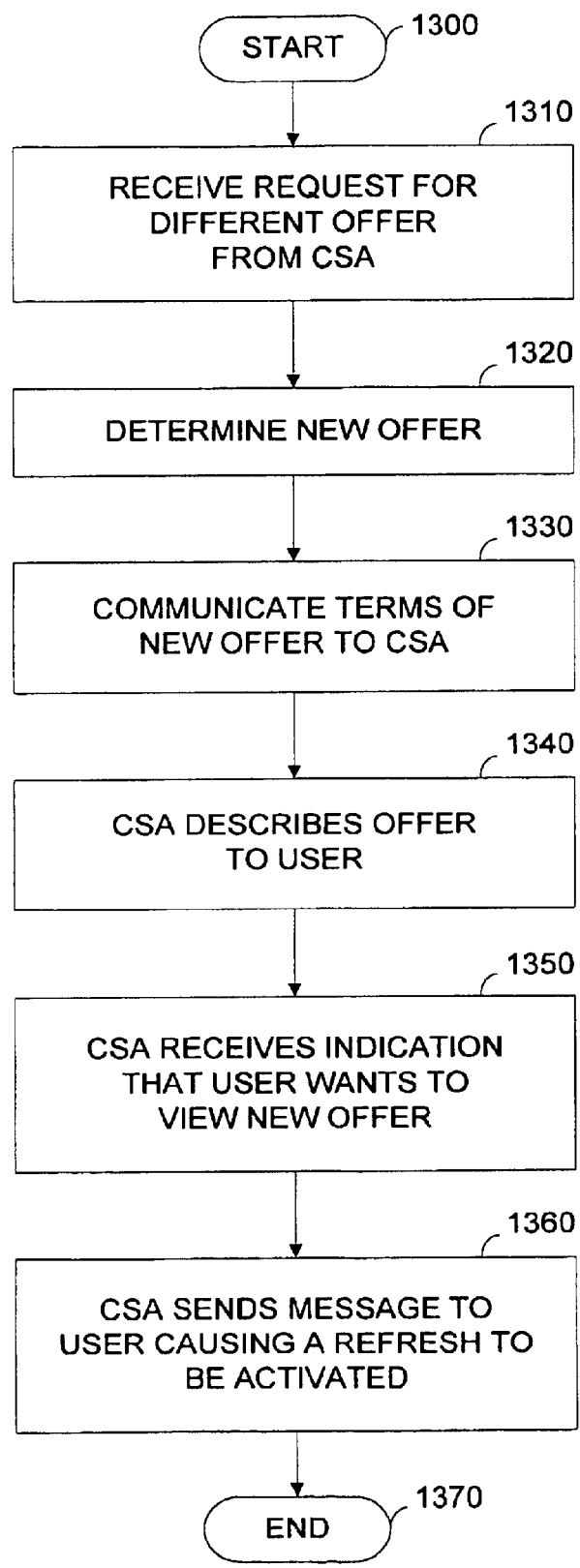
FIG. 13 is a flow chart illustrating a process used in one embodiment to automatically generate a refresh on the applicant's browser.

FIG. 13 is a flow chart illustrating a process used in one embodiment to automatically generate a refresh on the applicant's browser. The process starts at 1300. In a step 1310, a request is received for a different offer from the customer service agent. The new offer is determined in a step 1320. The terms of the new offer are communicated to the customer service agent in step 1330. In a step 1340, the customer service agent describes the offer to the user. Then, in a step 1350, the customer service agent receives an indication that the user wants to view the new offer. The customer service agent then sends a message to the user in step 1360 that causes a refresh to be activated. As described above, the message may include writing a certain value to a defined memory location that is periodically examined by the browser for the purpose of determining whether a refresh has been requested by the customer service agent. Once one refresh is generated in this manner, the value that the browser looks for may be incremented so that each time it finds the same value, a new refresh is not generated. The process ends at 1370.

A system and method for activating a chat interface with a customer service agent that has access to information about an application for credit has been described. In one embodiment, the chat interface is used to obtain information about why an applicant is rejecting an offer of credit and to identify unacceptable terms. Those unacceptable terms are communicated to a counter offer server and the counter offer server generates a new offer that improves the unacceptable term. The new offer is communicated to the applicant using the chat interface and a web page showing the new offer with an opportunity to accept the offer is displayed to the applicant when the applicant's browser is refreshed.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of offering credit to an applicant over a network, comprising:

determining a plurality of offers using information about the applicant;

displaying a displayed offer and withholding a withheld offer;

receiving over the network an indication that the displayed offer is unacceptable;

adding a condition to the withheld offer; and displaying the withheld offer;
wherein the condition is a requirement that a specified number of purchases be made.

2. A method of offering credit to an applicant over a network, comprising:
   determining an offer using information about the applicant;
   displaying the offer to the applicant;
   receiving over the network an indication that the displayed offer is unacceptable;
   determining an attribute of the offer that is unacceptable; and
   in the event that the unacceptable attribute is the amount of the credit limit; recalulating the credit limit for the applicant, including by determining whether the credit limit is too low for new purchases or too low for a balance transfer.

3. A method of offering credit as recited in claim 2 further including, in the event that the credit limit is too low for new purchases, raising the credit limit and decreasing a required balance transfer to provide more credit for new purchases.

4. A method of offering credit as recited in claim 2 further including, in the event that the credit limit is too low for a requested balance transfer, raising the credit limit to a predetermined amount above the requested balance transfer and checking whether the raised credit limit is acceptable.

5. A method of offering credit as recited in claim 4 wherein the information about the applicant includes a FICO score.

6. A method of offering credit as recited in claim 2 further including determining whether the credit limit can be raised enough to meet a requested amount of credit for new purchases based on information about the applicant.

7. A method of offering credit to an applicant comprising:
   determining a first offer using information about the applicant;
   displaying the first offer to the applicant;
   receiving an indication that the offer is unacceptable;
   activating a chat interface between the applicant and a customer service agent upon receiving said indication that the offer is unacceptable;
   determining a second offer for the applicant based on chat between the applicant and the customer service agent; and
   displaying the second offer to the applicant.

8. A method of offering credit as recited in claim 7 further including instructing the applicant via the chat interface to activate a refresh button to view the second offer.

9. A method of offering credit as recited in claim 7 further including writing a data value using the chat interface that causes the applicant's browser to refresh and view the second offer.

10. A method of offering credit as recited in claim 9 wherein writing a data value using the chat interface includes setting a flag.

11. A method of offering credit as recited in claim 7 wherein the customer service agent determines an attribute of the first offer that is unacceptable from on line chat between the customer service agent and the applicant.

12. A method of offering credit as recited in claim 7 wherein the first offer is determined by an application server in communication with an application database used to generate the first offer to the applicant and wherein the customer service agent communicates an attribute of the first offer that is unacceptable to the application server.

13. A method of offering credit as recited in claim 12 wherein the second offer is communicated to the customer service agent from the application server.

14. A method of offering credit as recited in claim 13 wherein the application server includes a web server for initial offers and a counter offer server for counter offers, wherein the web server and the counter offer server both have access to the application database.

15. A method of offering credit as recited in claim 13 further including describing the second offer to the applicant via the chat interface.

16. A method of offering credit as recited in claim 15 further including instructing the applicant via the chat interface to activate a refresh button to view the second offer.

17. A method of offering credit as recited in claim 15 wherein the attribute is selected by a customer service agent based on line chat between the customer service agent and the applicant.

* * * * *